US009749998B2

(12) United States Patent
Takeda et al.

(10) Patent No.: US 9,749,998 B2
(45) Date of Patent: Aug. 29, 2017

(54) RADIO COMMUNICATION METHOD, RADIO COMMUNICATION SYSTEM, RADIO BASE STATION AND USER TERMINAL

(71) Applicant: NTT DOCOMO, INC., Tokyo (JP)

(72) Inventors: Kazuaki Takeda, Tokyo (JP); Yoshihisa Kishiyama, Tokyo (JP); Kohei Kiyoshima, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 49 days.

(21) Appl. No.: 14/418,188

(22) PCT Filed: Jul. 26, 2013

(86) PCT No.: PCT/JP2013/070302
§ 371 (c)(1),
(2) Date: Jan. 29, 2015

(87) PCT Pub. No.: WO2014/021210
PCT Pub. Date: Feb. 6, 2014

(65) Prior Publication Data
US 2015/0195830 A1 Jul. 9, 2015

(30) Foreign Application Priority Data
Aug. 2, 2012 (JP) ................................ 2012-172276

(51) Int. Cl.
*H04W 72/04* (2009.01)
*H04W 24/10* (2009.01)
(Continued)

(52) U.S. Cl.
CPC ...... *H04W 72/0413* (2013.01); *H04B 7/0626* (2013.01); *H04L 5/0057* (2013.01);
(Continued)

(58) Field of Classification Search
None
See application file for complete search history.

(56) References Cited

U.S. PATENT DOCUMENTS

2009/0181712 A1\* 7/2009 Xu ........................ H04L 1/0026
455/522
2010/0074208 A1\* 3/2010 Farajidana ............ H04L 1/1621
370/329
(Continued)

OTHER PUBLICATIONS

International Search Report for corresponding International Application No. PCT/JP2013/070302, mailed Oct. 29, 2013 (1 page).
(Continued)

*Primary Examiner* — Bunjob Jaroenchonwanit
(74) *Attorney, Agent, or Firm* — Osha Liang LLP

(57) ABSTRACT

A radio communication method of a user terminal and a radio base station adopting carrier aggregation to adequately feed back channel state information of a plurality of cells from a user terminal to a radio base station, is disclosed. The user generates channel state information of each cell in uplink control channel format 2 or in format 3 based on the number of cells to use in carrier aggregation, feeds back the generated channel state information via resources that the radio base station sets in an uplink control channel of a primary cell at a predetermined time in accordance with an uplink control channel format, and the radio base station secures the resources to set in the uplink control channel when the channel state information of the primary cell is generated in uplink control channel format 2, regardless of the number of cells to use in carrier aggregation.

14 Claims, 11 Drawing Sheets

(51) Int. Cl.
*H04L 27/26* (2006.01)
*H04B 7/06* (2006.01)
*H04L 5/00* (2006.01)

(52) U.S. Cl.
CPC ......... *H04L 27/2636* (2013.01); *H04W 24/10* (2013.01); *H04L 5/001* (2013.01); *H04L 5/0064* (2013.01)

(56) References Cited

U.S. PATENT DOCUMENTS

| | | | |
|---|---|---|---|
| 2010/0272019 A1* | 10/2010 | Papasakellariou | H04B 7/0417 370/328 |
| 2010/0278109 A1* | 11/2010 | Papasakellariou | H04L 5/0037 370/328 |
| 2011/0249578 A1* | 10/2011 | Nayeb Nazar | H04L 1/0027 370/252 |
| 2011/0300889 A1* | 12/2011 | Lee | H04W 28/06 455/509 |
| 2012/0039252 A1* | 2/2012 | Damnjanovic | H04L 1/0026 370/328 |
| 2012/0082042 A1* | 4/2012 | Lunttila | H04B 7/0626 370/252 |
| 2012/0082157 A1* | 4/2012 | Yamada | H04L 1/0073 370/389 |
| 2012/0083284 A1* | 4/2012 | Harrison | H04L 1/1692 455/450 |
| 2012/0083309 A1* | 4/2012 | Kwon | H04B 17/382 455/522 |
| 2012/0088533 A1* | 4/2012 | Khoshnevis | H04L 1/0026 455/509 |
| 2012/0093117 A1* | 4/2012 | Suzuki | H04L 5/001 370/329 |
| 2012/0106472 A1* | 5/2012 | Rosa | H04W 72/0453 370/329 |
| 2012/0106478 A1* | 5/2012 | Han | H04L 5/0053 370/329 |
| 2012/0113827 A1* | 5/2012 | Yamada | H04L 1/0031 370/252 |
| 2012/0120817 A1* | 5/2012 | Khoshnevis | H04L 1/0026 370/252 |
| 2012/0140708 A1* | 6/2012 | Choudhury | H04W 72/082 370/328 |
| 2012/0155337 A1* | 6/2012 | Park | H04L 1/1692 370/280 |
| 2012/0176887 A1* | 7/2012 | Mcbeath | H04L 1/1822 370/216 |
| 2012/0176956 A1* | 7/2012 | Ji | H04B 7/15542 370/315 |
| 2012/0307733 A1* | 12/2012 | Kim | H04L 1/0031 370/328 |
| 2013/0083748 A1* | 4/2013 | Li | H04L 5/14 370/329 |
| 2013/0114455 A1* | 5/2013 | Yoo | H04W 24/00 370/252 |
| 2013/0121270 A1* | 5/2013 | Chen | H04L 5/001 370/329 |
| 2013/0208665 A1* | 8/2013 | Baldemair | H04L 1/0031 370/329 |
| 2013/0322376 A1* | 12/2013 | Marinier | H04W 72/06 370/329 |
| 2013/0343327 A1* | 12/2013 | Jang | H04J 13/22 370/329 |
| 2014/0029532 A1* | 1/2014 | Han | H04W 72/0413 370/329 |
| 2014/0029533 A1* | 1/2014 | Han | H04W 72/0413 370/329 |
| 2014/0036664 A1* | 2/2014 | Han | H04W 24/04 370/230 |
| 2014/0050113 A1* | 2/2014 | Rosa | H04W 52/0229 370/252 |
| 2014/0119284 A1* | 5/2014 | Baldemair | H04L 5/003 370/328 |
| 2014/0161060 A1* | 6/2014 | Nam | H04L 5/0055 370/329 |
| 2014/0286276 A1* | 9/2014 | Lunttila | H04B 7/024 370/329 |
| 2014/0295909 A1* | 10/2014 | Ouchi | H04W 52/242 455/522 |
| 2015/0131569 A1* | 5/2015 | Rosa | H04W 72/042 370/329 |
| 2015/0327255 A1* | 11/2015 | Tamaki | H04L 1/1854 370/280 |

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

* cited by examiner

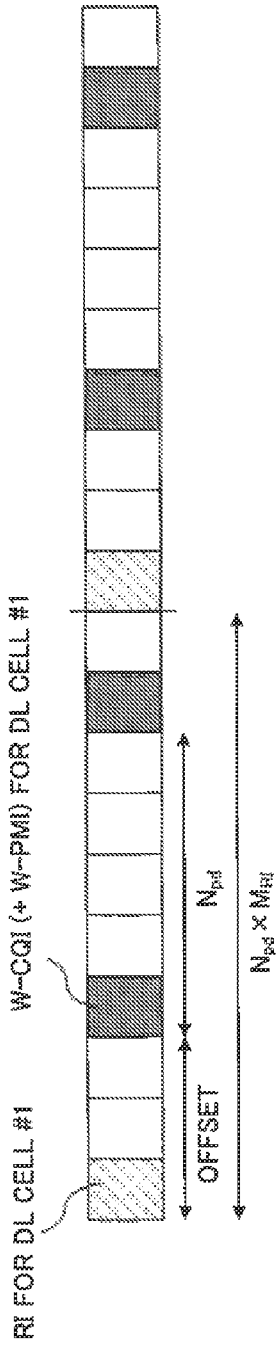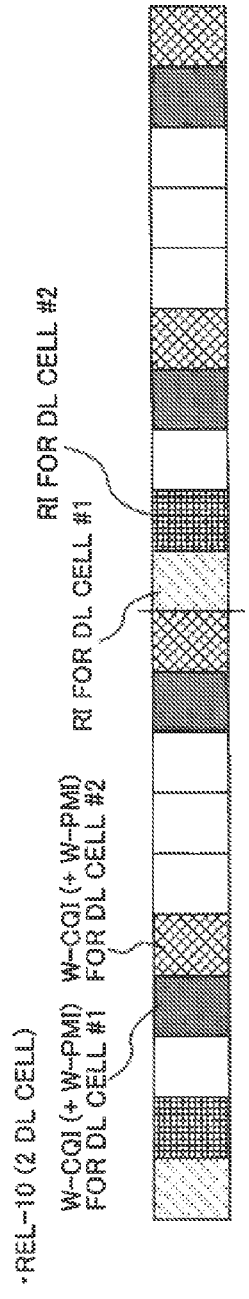
FIG.2A
PRIOR ART
FIG.2B
PRIOR ART

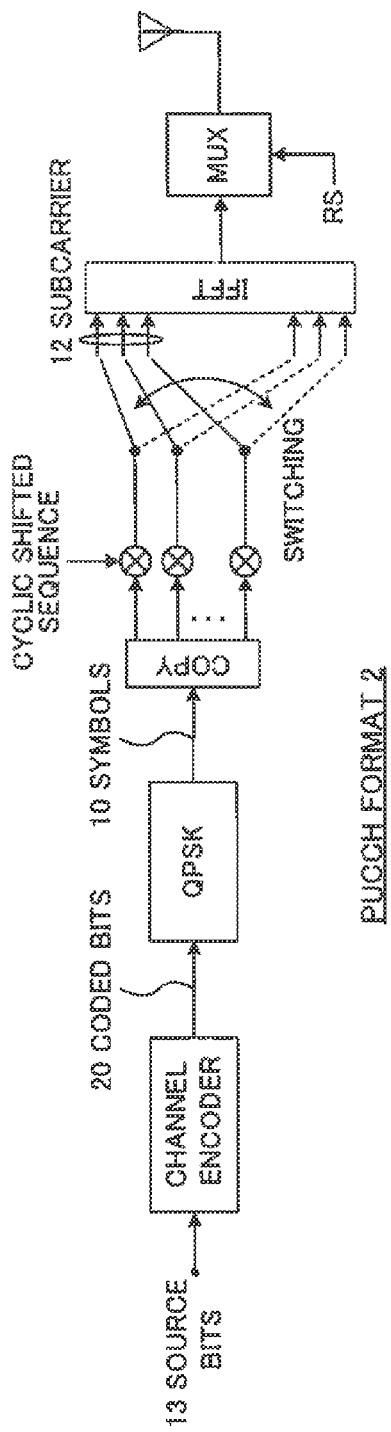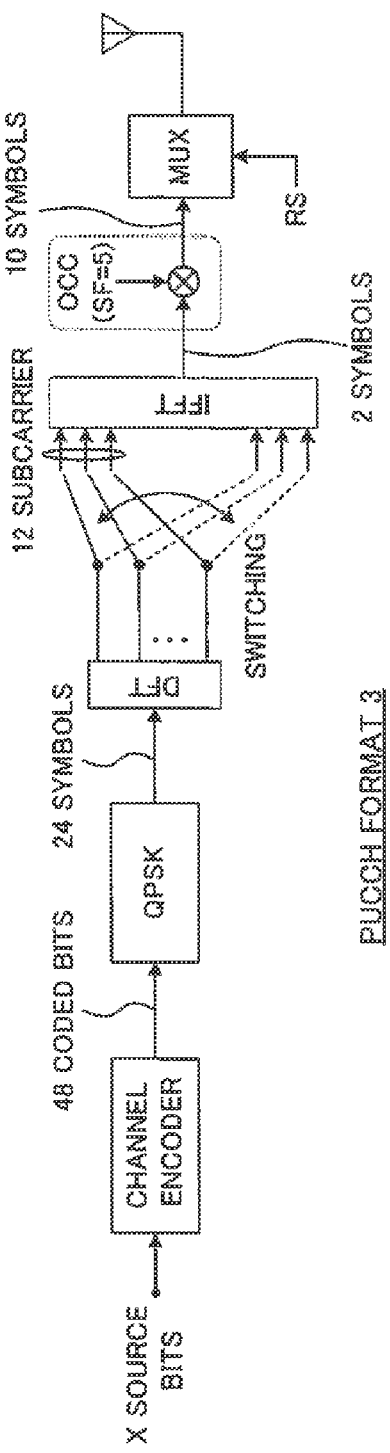

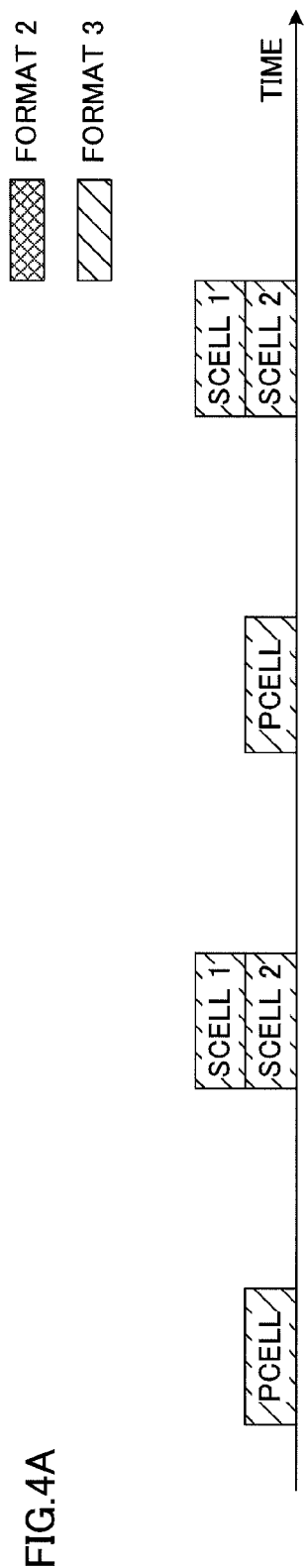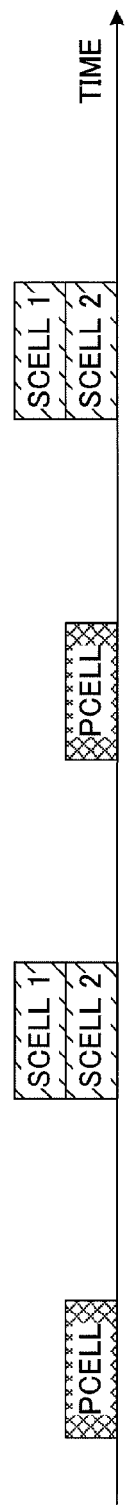

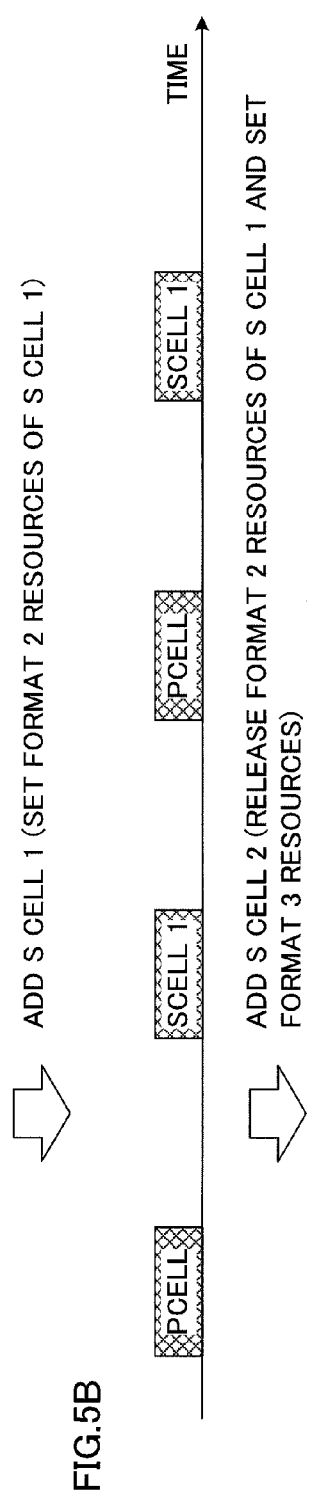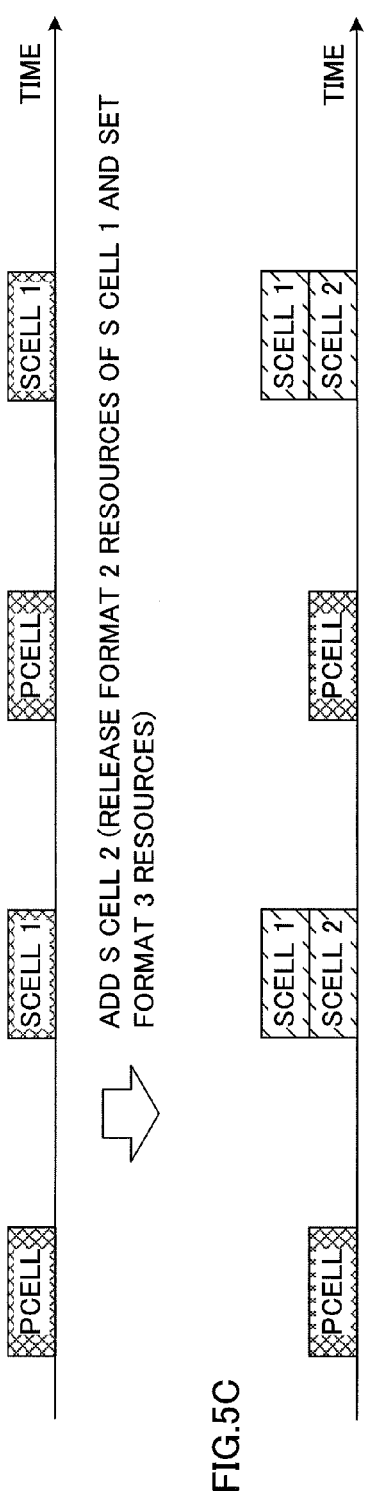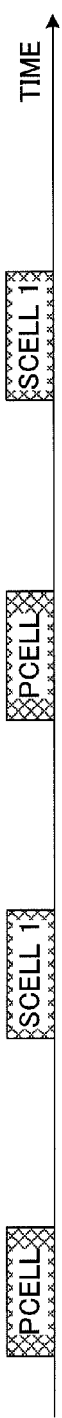

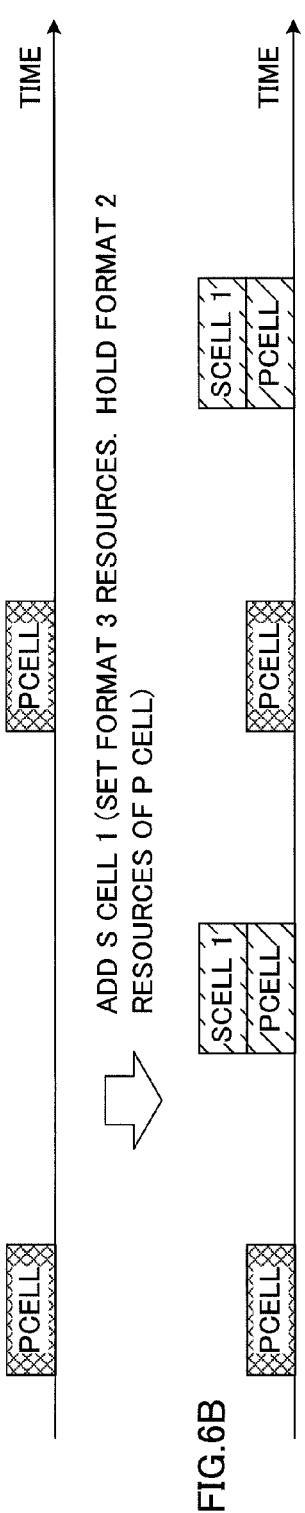
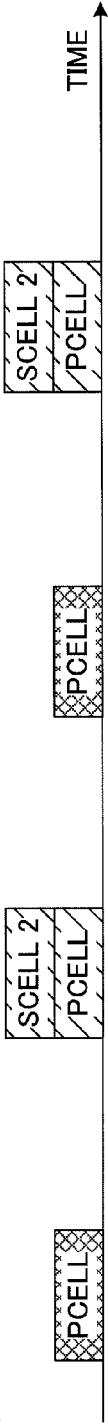

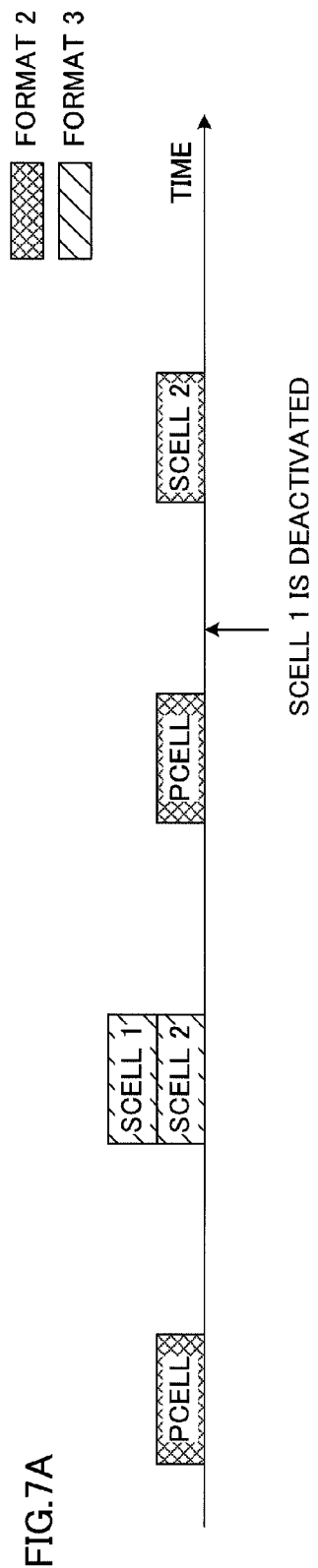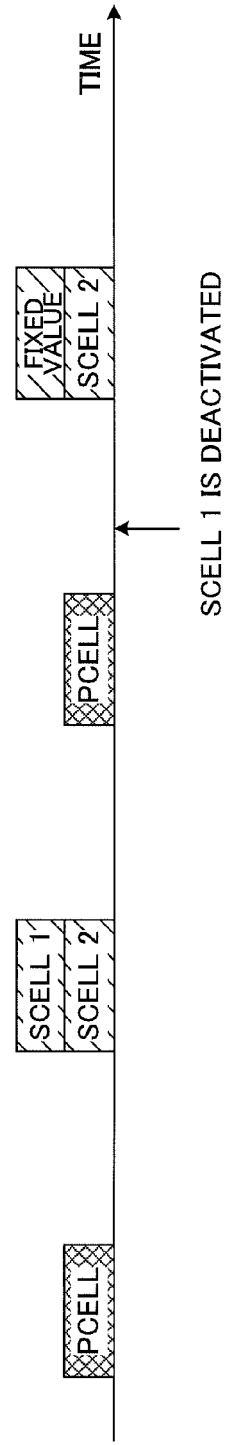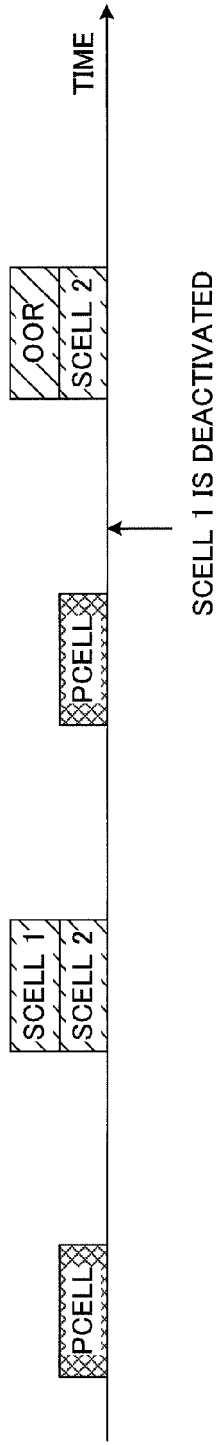

FIG. 11A
(User Terminal)
FIG. 11B
(Radio Base Station)
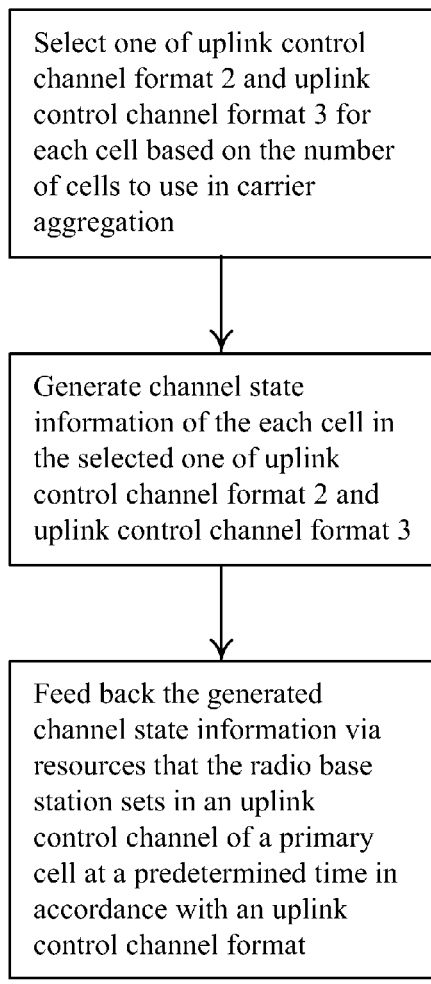
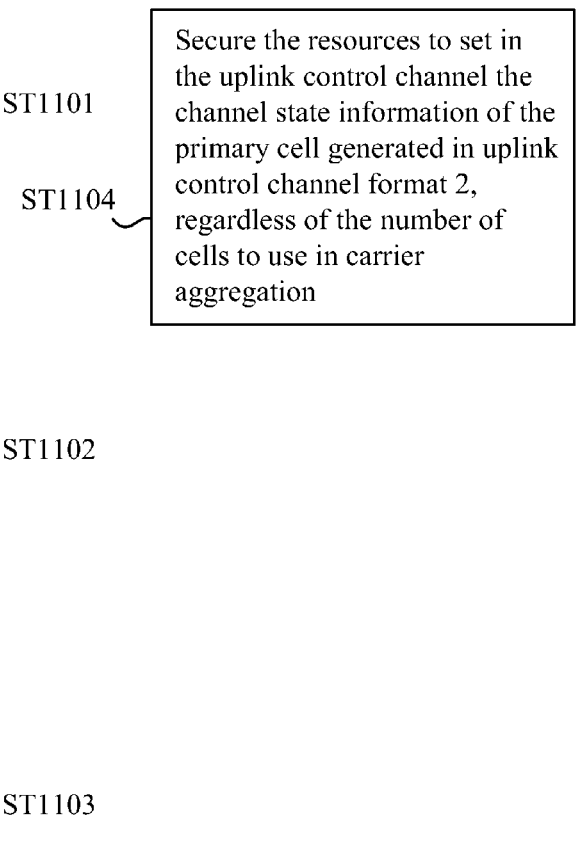

RADIO COMMUNICATION METHOD, RADIO COMMUNICATION SYSTEM, RADIO BASE STATION AND USER TERMINAL

TECHNICAL FIELD

The present invention relates to a radio communication method, a radio communication system, a radio base station and a user terminal that are applicable to cellular systems and so on.

BACKGROUND

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, LTE (Long-Term Evolution) is under study for the purposes of further increasing high-speed data rates, providing low delay, and so on (non-patent literature 1).

In a third-generation system, it is possible to achieve a transmission rate of maximum approximately 2 Mbps on the downlink by using a fixed band of approximately 5 MHz. In a system of the LTE system, it is possible to achieve a transmission rate of about maximum 300 Mbps on the downlink and about 75 Mbps on the uplink by using a variable band which ranges from 1.4 MHz to 20 MHz. With the UMTS network, successor systems of LTE are also under study for the purposes of achieving further broadbandization and higher speed (for example, LTE-advanced ("LTE-A")).

In the downlink of the LTE system (for example, Rel-8 LTE), CRSs (Cell-specific Reference Signals) that are associated with cell IDs are defined. The CRSs are used to demodulate user data, and, besides, used to measure downlink channel quality (CQI: Channel Quality Indicator) for scheduling and adaptive control, and so on. In the downlink of the LTE-A system (for example, Rel-10 LTE), which is a successor system of LTE, CSI-RSs (Channel State Information-Reference Signals) are under study, as reference signals for measuring channel state information (CSI). The CSI-RSs can support channel quality measurements of a plurality of cells, taking into account transmission and reception of signals between a plurality of cells. A user terminal feeds back channel state information to radio base stations, and the radio base stations control scheduling, adaptive radio link control, the number of layers to transmit and so on, based on the channel state information.

In the LTE-A system, carrier aggregation (CA) to achieve broadbandization by aggregating a plurality of fundamental frequency blocks (component carriers ("CCs")) of different frequency bands is under study. With the LTE-A system, an agreement has been reached to make a single fundamental frequency block a frequency band that can be used in the LTE system (for example, 20 MHz), in order to realize broadbandization while maintaining backward compatibility with the LTE system. For example, when five fundamental frequency blocks (cells) are aggregated, the system band becomes 100 MHz.

CITATION LIST

Non-Patent Literature

Non-Patent Literature 1: 3GPP, TR25.912 (V7.1.0), "Feasibility Study for Evolved UTRA and UTRAN," September 2006

SUMMARY OF THE INVENTION

Technical Problem

As described above, in the LTE-A system, in downlink transmission, carrier aggregation to realize broadbandization using a plurality of fundamental frequency blocks (cells) having different frequency bands is adopted. In uplink transmission, to achieve single-carrier characteristics, a study is in progress to carry out uplink data transmission using a single fundamental frequency block (for example, a primary cell) even when a plurality of uplink frequency blocks are set.

In this case, a user terminal needs to feed back CSI (channel state information) (CSI reports) periodically by setting CSI of each of a plurality of cells that have been used in downlink transmission, in uplink control channel (PUCCH: Physical Uplink Control CHannel) resources of the primary cell. When the CSIs of a plurality of cells (for example, CQIs) are fed back periodically using a conventional single-cell uplink control channel format (PUCCH format 2), it is necessary to set each cell's CSI in PUCCH resources at different times (different subframes), separately, and feed back the CSIs. However, there is a problem that, as the number of cells to use in carrier aggregation increases, the frequency with which CSI is fed back increases, which then results in increased PUCCH overhead.

The present invention has been made in view of the above, and it is therefore an object of the present invention to feed back channel state information of a plurality of cells from a user terminal to radio base stations adequately, even when carrier aggregation is adopted.

Solution to Problem

The radio communication method of the present invention is a radio communication method of a user terminal and a radio base station adopting carrier aggregation, and this radio communication method has the steps in which the user terminal generates channel state information of each cell in uplink control channel format 2 or in format 3 based on the number of cells to use in carrier aggregation and feeds back the generated channel state information via resources that the radio base station sets in an uplink control channel of a primary cell at a predetermined time in accordance with an uplink control channel format, and the radio base station secures the resources to set in the uplink control channel when the channel state information of the primary cell is generated in uplink control channel format 2, regardless of the number of cells to use in carrier aggregation.

Technical Advantage of the Invention

According to the present invention, even when carrier aggregation is adopted, it is possible to feed back channel state information of a plurality of cells from a user terminal to radio base stations adequately.

BRIEF DESCRIPTION OF THE DRAWINGS

FIGS. 2A and 2B provide diagrams to show transmission times of CSI that is fed back periodically via an uplink control channel;

FIGS. 3A and 3B provide diagrams to explain uplink control channel formats;

FIGS. 4A and 4B provide diagrams to show an example when a plurality of CSIs are set in an uplink control channel at a predetermined time, in accordance with PUCCH formats;

FIGS. 5A, 5B, 5C, and 5D provide diagrams to show an example of PUCCH formats to apply to each cell's CSI and transmission times of CSI to be fed back, when carrier aggregation is conducted;

FIGS. 6A, 6B, 6C, and 6D provide diagrams to show another example of PUCCH formats to apply to each cell's CSI and transmission times of CSI to be fed back, when carrier aggregation is conducted;

FIGS. 7A, 7B, and 7C provide diagrams to explain PUCCH formats to be applied to CSI in a case where a secondary cell is deactivated (deactivation) by MAC control, when carrier aggregation is conducted;

FIGS. 11A and 11B are flowcharts to explain the radio communication method of a user terminal and a radio base station adopting carrier aggregation, in accordance with one or more embodiments.

DESCRIPTION OF EMBODIMENTS

As described above, the user terminal measures CSI based on reference signals (CSI-RSs) transmitted from radio base stations, and then feeds back the CSI to the radio base stations. In the LTE-A system, a method to feed back CSI periodically using an uplink control channel (PUCCH) (periodic CSI reporting) and a method to feed back CSI aperiodically using an uplink shared channel (PUSCH: Physical Uplink Shared CHannel) (aperiodic CSI reporting) are defined as CSI feedback methods. Uplink channel configurations and physical uplink control channel formats will be described below with reference to FIG. 1.

Figure 1A:
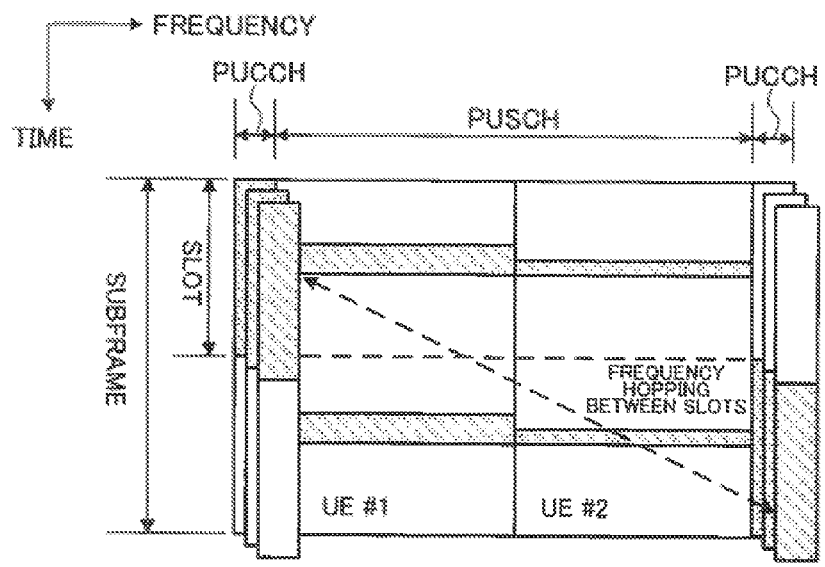
FIGS. 1A, 1B, and 1C provide diagrams to show uplink channel configurations and physical uplink control channel formats.

As shown in FIG. 1, signals to be transmitted in uplink transmission are mapped to adequate radio resources and transmitted from user terminals (UE (User Equipment) #1 and UE #2) to radio base stations. In this case, user data is allocated to an uplink shared channel (PUSCH). When control information is transmitted at the same time with user data, the control information is time-multiplexed with the PUSCH, and, when control information alone is transmitted, the control information is allocated to an uplink control channel (PUCCH). This control information to be transmitted on the uplink includes channel state information (CSIs) including downlink quality information (CQIs), PMIs (Precoding Matrix Indicators), RIs (Rank Indicators), and retransmission acknowledgement signals (ACKs/NACKs) in response to downlink shared channel (PDSCH: Physical Downlink Shared CHannel) signals, and so on.

Figure 1B:
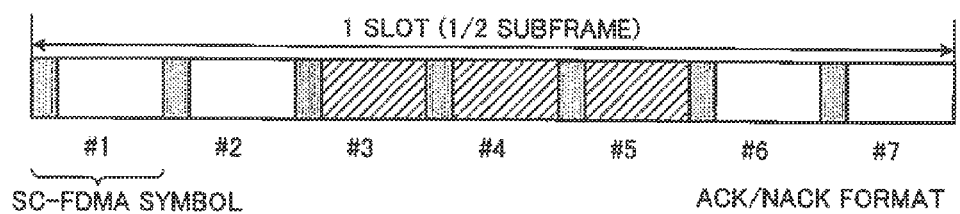
Figure 1C:
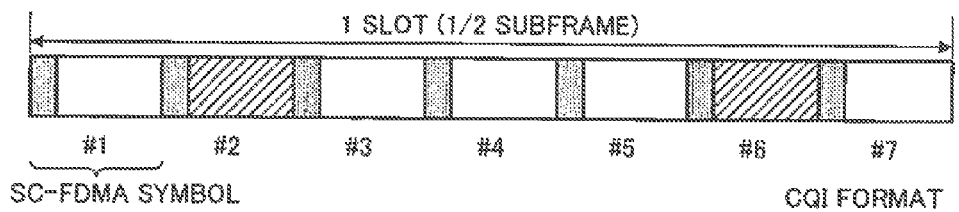

The PUCCH typically assumes different subframe configurations (PUCCH formats) when transmitting channel state information such as CQIs and when transmitting ACKs/NACKs (see FIGS. 1B and 1C). The PUCCH subframe configuration includes seven SC-FDMA symbols in one slot (½ subframe). One SC-FDMA symbol includes twelve information symbols (subcarriers).

To be more specific, in the ACK/NACK subframe configuration (ACK/NACK format (PUCCH formats 1, 1a and 1b)), as shown in FIG. 1B, reference signals (RSs) are multiplexed on the third symbol (#3) to the fifth symbol (#5) in the slot, and control information (ACKs/NACKs) is multiplexed on the other symbols (the first symbol (#1), the second symbol (#2), the sixth symbol (#6), and the seventh symbol (#7)).

Also, in the CQI subframe configuration (CQI format (PUCCH formats 2, 2a and 2b)), as shown in FIG. 1C, reference signals are multiplexed on the second symbol (#2) and the sixth symbol (#6) in the slot, and control information (CQI) is multiplexed on the other symbols (the first symbol (#1), the third symbol (#3) to the fifth symbol (#5) and the seventh symbol (#7)).

The PUCCH is multiplexed on the radio resources at both ends of the system band, and frequency hopping (inter-slot FH) is applied between the two slots having different frequency bands in one subframe.

CSI transmission times when CSI is fed back periodically using the uplink control channel (PUCCH) will be described with reference to FIG. 2. FIG. 2A shows times to feed back a single cell's CSI (without carrier aggregation application) in Rel-8/9 and FIG. 2B shows times to feed back a plurality of cells' CSIs (with carrier aggregation application) in Rel-10.

With Rel-8/9 ($N_{pd}$=5 and $M_{RI}$=2) illustrated in FIG. 2A, a case is illustrated where, to DL cell #1, a user terminal generates periodic CSI (periodic CSI reporting) in PUCCH format 2 and feeds back the CSI via PUCCH resources that are set in predetermined times. Here, a case is shown where the PUCCH reporting mode is mode 1-0 or mode 1-1, the CQI/PMI reporting cycle is five subframes ($N_{pd}$=5), the RI reporting cycle is twice the CQI/PMI reporting cycle ($M_{RI}$=2), and the subframes to feed back RIs are two subframes off-set from the subframes to feed back CQIs/PMIs.

In mode 1-0, a CQI feedback type to feed back wide band CQIs (WB-CQIs) and a PMI feedback type not to feed back PMIs are combined. In mode 1-1, a CQI feedback type to feed back WB-CQIs and a PMI feedback type to feed back PMIs are combined. In each reporting mode, besides CQIs and PMIs, RIs are also fed back in different subframes.

With Rel-10 (two DL cells) illustrated in FIG. 2B, a case is illustrated where, to DL cell #1 and DL cell #2, a user terminal UE generates CSI in PUCCH format 2 and feeds back the CSI via PUCCH resources that are set in different times (subframes). Note that, in FIG. 2B, a case is shown where the PUCCH reporting mode, the CQI/PMI reporting cycle, the RI reporting cycle and offsets are configured the same as in FIG. 2A.

As shown in FIG. 2B, when a plurality of cells' CSIs, to which PUCCH format 2 is applied, are fed back periodically using PUCCH resources of a predetermined cell (for example, a primary cell), CQIs/PMIs and RIs for DL cell #1 and DL cell #2 are fed back at different times (subframes).

In this way, if the user terminal feeds back each cell's CSI at different times, there is a threat that, as the number of cells to use in carrier aggregation increases, the frequency with which CSI is fed back increases, which then results in increased PUCCH overhead. When CSI feedback and retransmission control signal (ACK/NACK) feedback collide and the retransmission control signal feedback is prioritized (the CSI feedback is dropped), cases might occur where CSI is not adequately fed back, due to increase in the number of cells to use in carrier aggregation. By this means, there is a threat that downlink transmission throughput decreases.

So, to feed back a plurality of cells' CSIs at the same time (in one subframe), it may be possible to apply PUCCH format 3 (see FIG. 3B), which has larger capacity than PUCCH format 2 (see FIG. 3A), to each cell's CSI. In this case, it is possible to support CSI reporting for a plurality of cells in one subframe.

PUCCH format 3 is a PUCCH format that is defined anew in LTE-A, and is able to transmit numerous ACK/NACK bits. To be more specific, in PUCCH format 3, similar to the PDSCH, signals are generated by DFT (Discrete Fourier Transform)-based precoding, and it is possible to multiplex different UEs by orthogonal codes (OCCs: Orthogonal Cover Codes) (see FIG. 3B). To be more specific, a plurality of cells' ACKs/NACKs are subjected to channel coding and output so that the number of bits per subframe is forty-eight bits. The forty-eight-bit output sequence is made twenty-four symbols through phase shift keying modulation (QPSK) and then subjected to a DFT process.

By applying PUCCH format 3, the FDD system supports maximum ten ACKs/NACKs and the TDD system supports maximum twenty-bits of ACKs/NACKs. That is, PUCCH format 3 provided anew is defined as a format for feedback of a plurality of cells' ACKs/NACKs when carrier aggregation is adopted.

So, a study in which a plurality of cells' CSIs are generated in PUCCH format 3, allocated to PUCCH resources of the same time (the same subframe) and fed back, when using a plurality of cells by adopting carrier aggregation, is in progress. Note that, when the mechanism of conventional PUCCH format 3 to apply to ACKs/NACKs, is applied to CSI feedback, this is still referred to as "PUCCH format 3" herein, but the name of the format is not limited to this.

Next, a case where PUCCH format 3 is applied to a plurality of cells' CSIs will be described. FIG. 4A shows a case where the user terminal receives downlink signals from a plurality of cells by adopting carrier aggregation, applies PUCCH format 3 to all of the plurality of cells' CSIs and feeds back the CSIs. Note that, in FIG. 4A, a case is shown where three cells (one primary cell and two secondary cells) are used in downlink transmission, each cell's CSI is generated in PUCCH format 3, and the CSIs of the two secondary cells are fed back via PUCCH resources of the same subframes.

By generating a plurality of cells' CSIs in PUCCH format 3, it is possible to support CSI reporting for a plurality of cells in one subframe. However, the present inventors have found out that, when applying PUCCH format 3 to the CSIs of all cells, as shown in FIG. 4A, the fluctuation of the number of cells to use in carrier aggregation gives a threat that communication with higher layers is interrupted during configurations that are necessitated by changes of the PUCCH formats to apply to the CSIs and so on.

For example, when communication is performed with one cell (primary cell) (upon initial access and so on), it is desirable to apply PUCCH format 2 and generate CSI, taking into account the amount of CSI information (efficient use of PUCCH resources) and backward compatibility with Rel-8. In this case, when secondary cells are added and removed, it is necessary to set PUCCH resources for the new PUCCH formats and also release the resources of the PUCCH formats that are not used. In this way, when PUCCH resources are set and released to change the PUCCH formats, there is a threat that communication with higher layers is interrupted.

So, the present inventors have conceived of using a plurality of PUCCH formats for each cell's CSI, selectively, in a state in which resources to set for the PUCCH are secured for feedback while PUCCH format 2 is applied to the CSI of the primary cell, regardless of the number of cell to use in carrier aggregation. The present inventors have found out that, by this means, even when the user terminal changes the PUCCH formats of a plurality of cells' CSIs, it is possible to maintain communication with higher layers in the primary cell and adequately feed back a plurality of cells' CSIs.

FIG. 4B shows an example of the operation of feeding back a plurality of CSIs according to the present invention. As shown in FIG. 4B, in a case where the user terminal uses a plurality of cells (here, one primary cell (P cell) and two secondary cells (S cells)) in carrier aggregation, resources to set in the PUCCH for feedback are secured when at least the CSI of the primary cell is generated in PUCCH format 2, and also the CSIs of a plurality of the secondary cells are fed back, by applying PUCCH format 3, via PUCCH resources of the same subframes.

In this way, when carrier aggregation is adopted, by securing resources to set in the PUCCH when the CSI of the primary cell is generated in PUCCH format 2, it is possible to use the same CSI feedback mechanism as in conventional systems (Rel-8, 10 and so on) for the primary cell. Also, even when the number of cells in carrier aggregation varies (secondary cells are added or removed), resources are secured for PUCCH format 2 for the primary cell, so that it is possible to continue communication even during configurations with higher layers.

Note that, although FIG. 4B shows an example to generate and feed back the CSI of the primary cell in PUCCH format 2, if PUCCH resources are secured for PUCCH format 2 for the CSI of the primary cell, the CSI of the primary cell may be generated and fed back in PUCCH format 3.

Note that, the PUCCH formats to apply to each cell's CSI and information related to the PUCCH resources (time and so on) to use for CSI feedback may be configured to be set in radio base stations and reported to the user terminal, or may be defined in advance by specifications. Note that although higher layer signaling (for example, RRC), broadcast signals, downlink control channels and so on may be used as reporting methods from the radio base stations to the user terminal, these are by no means limiting.

The PUCCH formats to apply to each cell's CSI and the method (time) to set each CSI to PUCCH resources, when the number of cells to use in carrier aggregation varies, will be described below with reference to the accompanying drawings.

(Resource setting method 1)

FIG. 5 show a first example of the method of setting resources. With the first example of the method of setting resources, when the number of cells to use in carrier aggregation is equal to or smaller than two (one P cell and one S cell), the user terminal applies PUCCH format 2 and generates each cell's CSI. When the number of cells to use in carrier aggregation is equal to or more than three (one P cell and two S cells), the user terminal generates each cell's CSI by applying PUCCH format 3 (or a combination of PUCCH formats 2 and 3). Also, between the user terminal and the radio base stations, resources to set in the PUCCH are secured for PUCCH format 2 for the primary cell, regardless of the number of cells to use in carrier aggregation.

Note that, when the number of cells to use in carrier aggregation is equal to or more than three, the user terminal may be configured to generate the CSI of a predetermined cell (for example, P cell) in PUCCH format 2 and generate the CSIs of the other cells (for example, a plurality of S cells) in PUCCH format 3. In this case, different PUCCH formats are applied per cell (for example, between the primary cell and the secondary cells).

An example of PUCCH formats which the user terminal applies to each cell's CSI and times to feed back the CSI, in accordance with the number of cells to use in carrier aggregation, will be described below. Note that, FIG. 5 show PUCCH resources to be set between the user terminal and the radio base stations as resources to feed back each CSI in the time axis direction.

FIG. 5A shows CSI feedback when downlink transmission is performed using a single cell (for example, upon initial access and so on) (primary cell). In this case, the user terminal generates the CSI of the primary cell in PUCCH format 2. Then, the user terminal feeds back the generated CSI periodically via PUCCH resources that are set by the radio base station. The CSI feedback method then can be in the same way as the conventional system (Rel-10).

FIG. 5B shows CSI feedback when one cell (secondary cell 1) to use for downlink transmission is added, that is, when two cells are used in carrier aggregation. In this case, the user terminal generates the CSI of the primary cell and the CSI of the secondary cell 1 separately in PUCCH format 2. Then, the user terminal feeds back each generated CSI at different times (subframes) via PUCCH resources that are set by the radio base station. The CSI feedback method then can be in the same way as the conventional system (Rel-10).

FIG. 5C shows CSI feedback when one more cell (secondary cell 2) to use for downlink transmission is added, that is, when three cells are used in carrier aggregation. In this case, the user terminal generates CSIs for at least two cells in PUCCH format 3.

Here, the user terminal generates the CSIs of the secondary cell 1 and the CSI of the secondary cell 2 in PUCCH format 3. Then, a case is shown where the user terminal feeds back the CSIs of the secondary cells 1 and 2 generated in PUCCH format 3 at the same time (the same subframe) via PUCCH resources that are set anew for PUCCH format 3 by the radio base station. In this case, the radio base station releases the resources for PUCCH format 2 for the secondary cell 1, and set resources for PUCCH format 3 anew.

FIG. 5C shows a case where, even if the cells to use become three cells, the CSI of the primary cell is generated in PUCCH format 2 (a case where different PUCCH formats are applied on a per cell basis). The user terminal feeds back the CSI of the primary cell generated in PUCCH format 2 via PUCCH resources that are set in different subframes from those of the CSIs of the secondary cells 1 and 2 generated in PUCCH format 3.

In this case, even if the number of cells to use in carrier aggregation is equal to or more than three, resources are secured for PUCCH format 2 for the primary cell. Consequently, to the primary cell, it is possible to apply the same method as CSI feedback in a conventional system (Rel-10).

Note that, in FIG. 5C, similar to the CSIs of the secondary cells 1 and 2, the user terminal is able to feed back the CSI of the primary cell by applying PUCCH format 3 in the same subframes as for the CSIs for the secondary cells 1 and 2. However, even in this case, the resources for PUCCH format 2 for the primary cell are not released and kept secured.

When applying PUCCH format 3 to each cell's CSI, it is preferable to decide a combination of CSIs to adopt PUCCH format 3, taking into account the relationship between the amount of CSI information of each cell and the capacity of PUCCH format 3. For example, if the total amount of CSI information of the three cells is within the capacity of PUCCH format 3, the user terminal generates the CSIs of the three cells in PUCCH format 3 and feeds back the CSIs via PUCCH resources of the same subframes.

FIG. 5D shows CSI feedback when a cell (secondary cell 2) to use for downlink transmission is removed, that is, when two cells are used in carrier aggregation (same as in FIG. 5B). In this case, the user terminal generates the CSI of the primary cell and the CSI of the secondary cell 1 both in PUCCH format 2. Then, the user terminal sets each cell's CSI that is generated to PUCCH resources at different times (subframes) and feeds back the CSIs.

Note that, in FIG. 5D, since PUCCH format 3 is set in the secondary cell 1 in FIG. 5C, it is necessary to release the PUCCH resources for PUCCH format 3 for the secondary cell 1 and re-set the PUCCH resources for PUCCH format 2 anew. As for the primary cell, since PUCCH resources are secured for PUCCH format 2, it is not necessary to re-set the PUCCH resources for PUCCH format 2.

By this means, by securing resources for PUCCH format 2 for the CSI of the primary cell, the user terminal can continue communicating with the primary cell (radio base station) without interruption, even during configurations with higher layers that are necessitated by changes of PUCCH formats, regardless of the numbers of cells that are used in carrier aggregation.

(Resource setting method 2)

FIG. 6 show a second example of the method of setting resources. With the second example of the method of setting resources, when the number of cells to use in carrier aggregation is equal to or more than two (one P cell and one S cell), the user terminal applies PUCCH format 3 and generates each cell's CSI. PUCCH resources are secured for PUCCH format 2 for the primary cell regardless of the number of cells to use in carrier aggregation. Resources for PUCCH format 2 are not set for the secondary cell (PUCCH format 3 alone is applied to the secondary cell).

Note that the user terminal may apply PUCCH format 2 to the CSI of the primary cell, even when the number of cells to use is equal to or more than two. An example of PUCCH formats which the user terminal applies to each cell's CSI and times to feed back the CSI, in accordance with the number of cells to use in carrier aggregation, will be described below. Note that FIG. 6 show PUCCH resources to be set between the user terminal and the radio base stations as resources to feed back each CSI in the time axis direction.

FIG. 6A shows CSI feedback when downlink transmission is performed using a single cell (for example, upon initial access and so on) (primary cell). In this case, the user terminal generates the CSI of the primary cell in PUCCH format 2, and feeds back the generated CSI via resources that are set in the PUCCH in a predetermined cycle. The CSI feedback method then can be in the same way as the conventional system (Rel-10).

FIG. 6B shows CSI feedback when one cell (secondary cell 1) to use for downlink transmission is added, that is, when two cells are used. In this case, the user terminal generates the CSIs of the primary cell and the secondary cell 1 in PUCCH format 3. Then, the user terminal feeds back each CSI generated in PUCCH format 3 at the same time (same subframes) via PUCCH resources that are set anew for PUCCH format 3.

That is, resources for PUCCH format 3 to apply to the CSIs of the primary cell and the secondary cell 1 are set anew between the radio base stations and the user terminal. However, the resources for PUCCH format 2 for the primary cell are not released and kept secured.

FIG. 6C shows CSI feedback when one more cell (secondary cell 2) to use for downlink transmission is added, that is, when three cells are used. In this case, the user terminal generates the CSIs of the primary cell, the secondary cell 1 and the secondary cell 2 in PUCCH format 3. That is, the user terminal re-sets PUCCH format 3. Then, the user terminal feeds back each CSI generated in PUCCH format 3 via the PUCCH resources for PUCCH format 3 that are already set.

By this means, even in a case where the number of cells to use in carrier aggregation increases, it is possible to reduce increase in the number of subframes of CSIs to feed back. In FIG. 6C, resources that are set for PUCCH format 2 for the primary cell are not released and kept secured.

FIG. 6D shows CSI feedback when a cell (secondary cell 2) to use for downlink transmission is removed, that is, when two cells are used (same as in FIG. 6B). In this case, the user terminal generates the CSIs of the primary cell and the secondary cell 1 in PUCCH format 3. That is, the user terminal re-sets PUCCH format 3. Then, the user terminal feeds back each CSI generated in PUCCH format 3 via the PUCCH resources for PUCCH format 3 that are already set.

Note that, although FIG. 6C shows a case where the CSI of the primary cell and the CSIs of the secondary cells 1 and 2 are generated in PUCCH format 3 and fed back in the same subframes, these are by no means limiting. When the total amount of each cell's CSI information is larger than the capacity of PUCCH format 3, for example, it may be possible to set PUCCH format 3 resources in different subframes, or it is equally possible to generate the CSIs of the secondary cells 1 and 2 in PUCCH format 3 and generate the CSI of the primary cell in PUCCH format 2.

By this means, by securing resources for PUCCH format 2 for the CSI of the primary cell, the user terminal can continue communicating with the primary cell (radio base station) without interruption, even during configurations with higher layers that are necessitated by changes of PUCCH formats, regardless of the numbers of cells that are used in carrier aggregation.

(Resource setting method when S cell is in a deactivation mode in carrier aggregation)

Next, the CSI feedback operation when the secondary cell is activated/deactivated by MAC (Medium Access Control) during carrier aggregation will be described.

In LTE-A, to realize optimized battery consumption in the user terminal when carrier aggregation is adopted, the mechanism of secondary cell activation/deactivation is supported. When the secondary cell is in the deactivated state, the user terminal does not need to receive downlink signals (the PDCCH signal and the PDSCH signal) from or transmit uplink signals, CQIs and so on to at the secondary cell. When the secondary cell is in the activated state, the user terminal needs to receive downlink signals (the PDCCH signal and the PDSCH signal) and transmits CQIs and so on.

The activation/deactivation control for the secondary cell can be controlled by MAC layer control. For example, the radio base station reports the state (activation/deactivation) of a plurality of secondary cells to the user terminal using bitmaps.

Now, as described above, when changing PUCCH formats in accordance with the number of cells to use and so on when carrier aggregation is adopted, following the changes of PUCCH formats, it is necessary to set PUCCH resources for CSI feedback anew in some cases. For example, when the secondary cell 1 that adopts PUCCH format 3 is deactivated by MAC layer control, from the state shown in above FIG. 5C, it is not necessary to feed back the CSI of the secondary cell 1.

Consequently, for the operation in this case, a method to generate the CSIs of the primary cell and the secondary cell 2 in PUCCH format 2 and feed back the CSIs may be possible (see FIG. 7A). In this case, the radio base station needs to release the resources for PUCCH format 3 for the secondary cell 2 and set resources for PUCCH format 2 anew, using RRC signaling. However, when deactivating the secondary cell by MAC layer control, it is necessary to re-set the resources of the PUCCH formats by RRC signaling.

Consequently, with the present embodiment, by providing a configuration, in which, when one of a plurality of secondary cells (for example, secondary cell 1) adopting PUCCH format 3 is deactivated from the state shown in above FIG. 5C, a predetermined value is set tentatively as the CSI of the secondary cell 1 and fed back, so that PUCCH format 3 is not changed and held. By holding the PUCCH format, it is not necessary to re-set resources for a new PUCCH format.

To be more specific, the user terminal makes the CQI bit value of the deactivated cell (for example, secondary cell 1) a fixed value (for example, 0) and feeds this back (see FIG. 7B). In this way, by setting and feeding back a fixed value that is provided in advance as the CQI of the deactivated cell, it is possible to improve reception characteristics using information that is provided in advance, in the radio base stations. Since the secondary cell 2 can continue using PUCCH format 3 for the secondary cell 2, RRC signaling that follows changes of PUCCH formats becomes unnecessary.

In addition, the user terminal may feed back out-of-range (OOR) CQI instead of tentatively setting the CQI bit value (fixed value) of the deactivated cell (for example, secondary cell 1) as a fixed value and transmitting it (see FIG. 7C). By feeding back an OOR CQI with respect to the deactivated cell, it is possible to prevent the user terminal and the radio base stations having different recognitions. Since the secondary cell 2 can continue using PUCCH format 3 for the secondary cell 2, RRC signaling that follows changes of PUCCH formats becomes unnecessary.

Note that, when all the secondary cells that should feed back CSIs in PUCCH format 3 are deactivated (for example, when the secondary cells 1 and 2 are deactivated in above FIG. 5C), it is possible to provide a configuration in which OOR CQIs are fed back for all of the secondary cells. Alternatively, it is equally possible to provide a configuration in which nothing is transmitted to all of the secondary cells (CSI feedback of all the secondary cells is deactivated).

As has been described above, in a configuration in which PUCCH formats are changed in accordance with the number of cells to use when carrier aggregation is adopted, even when a secondary cell is deactivated by MAC layer control, it is possible to make RRC signaling unnecessary by keeping the PUCCH format of the secondary cell.

Note that the operation described in FIG. 7 may be applied, in at least a configuration in which PUCCH formats are changed in accordance with the number of cells to use in a case where carrier aggregation is adopted, when the secondary cell is deactivated by MAC layer control. Note that it is equally possible to apply the operation described in FIG. 7 in combination with operation (securing PUCCH resources for PUCCH format 2 for the primary cell, regardless of the number of cells to use) in above-described FIG. 6 and FIG. 7.

(Configuration of a radio communication system)

A configuration of a user terminal, a radio base station and so on applying the radio communication method shown in the above embodiment will be described below. Here, a case where the radio base station and the user terminal supporting an LTE-A scheme system (LTE-A system) are used will be described.

Figure 8:
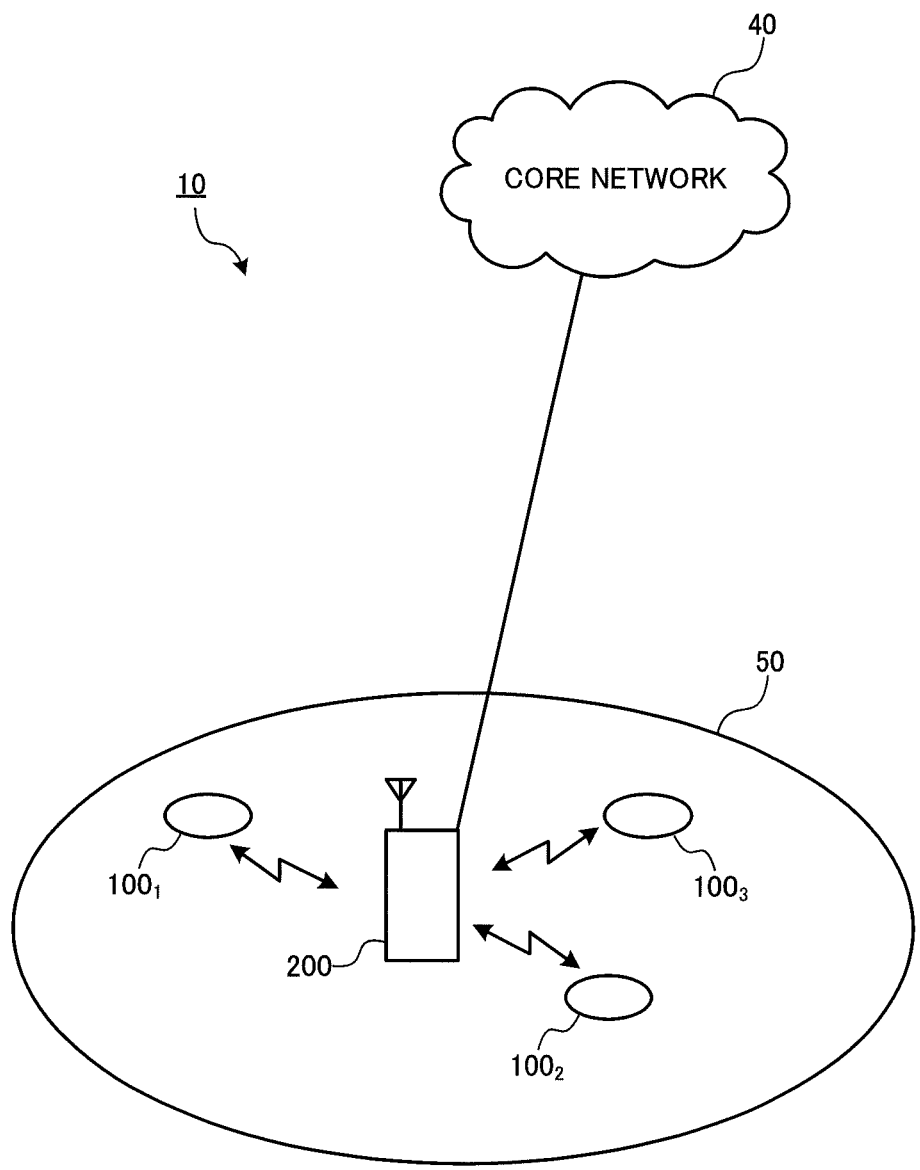
FIG. 8 is a diagram to explain a system configuration of a radio communication system.

First, a radio communication system 10 having user terminals 100 and a radio base station 200 will be described with reference to FIG. 8. FIG. 8 is a diagram to describe a configuration of the radio communication system 10 having the user terminals 100 and the radio base station 200 according to the present embodiment. Note that the radio communication system 10 shown in FIG. 8 is, for example, a system that accommodates an LTE system. This radio communication system 10 may be referred to as "IMT-Advanced" or may be referred to as "4G."

As shown in FIG. 8, the radio communication system 10 is configured to include a radio base station 200 and a plurality of user terminals 100 ($100_1$, $100_2$, $100_3$, . . . , $100_n$, and n is an integer of n>0) that communicate with this radio base station 200. The radio base station 200 is connected to a core network 40. The user terminals 100 communicate with the radio base station 200 in a cell 50. Note that the core network 40 may be, for example, an access gateway apparatus, a radio network controller (RNC), a mobility management entity (MME) and so on, but is by no means limited to these.

For radio access schemes, in the radio communication system 10, OFDMA (Orthogonal Frequency Division Multiple Access) is adopted on the downlink, and SC-FDMA (Single-Carrier Frequency Division Multiple Access) is adopted on the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Downlink communication channels include a PDSCH, which is used by each user terminal 100 on a shared basis as a downlink shared channel, and downlink L1/L2 control channels (PDCCH, PCFICH, and PHICH). Transmission data and higher control information are transmitted by the PDSCH. PDSCH and PUSCH scheduling information and so on are transmitted by the PDCCH. The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator CHannel). Reference signals (CSI-RSs and so on) to be used for channel estimation, received quality measurement and so on are transmitted.

Uplink communication channels include a PUSCH (Physical Uplink Shared CHannel), which is used by each user terminal on a shared basis as an uplink shared channel, and a PUCCH (Physical Uplink Control CHannel), which is an uplink control channel. By means of this PUSCH, transmission data and higher control information are transmitted. By means of the PUCCH, channel state information (CSI) that includes downlink received quality information (CQIs), ACKs/NACKs and so on are transmitted.

Next, the functional configurations of a user terminal for selectively using PUCCH formats to apply to each cell's CSI and feeding back the CSI, in accordance with the number of cells to use in carrier aggregation will be described with reference to FIG. 9.

Figure 9:
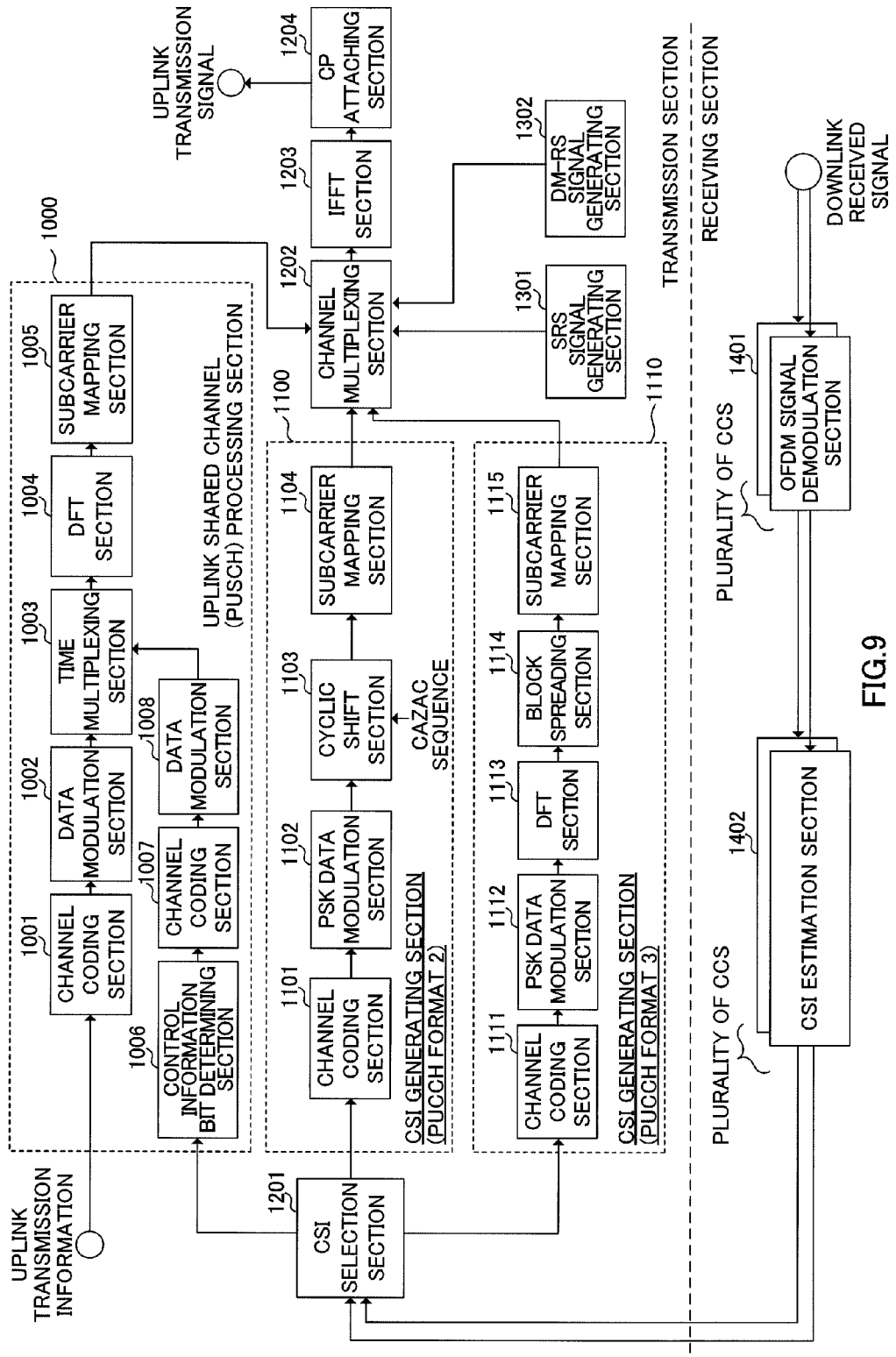
FIG. 9 is a diagram to explain a configuration of a user terminal.

The user terminal shown in FIG. 9 has a transmission section and a receiving section. The receiving section has an OFDM signal demodulation section 1401, which demodulates OFDM signals, and a CSI estimating section 1402, which estimates channel quality information CQI and so on based on downlink signals. The transmission section has a CSI selection section 1201, which selects the channels to feed back CSI and PUCCH formats, an uplink shared channel (PUSCH) processing section 1000, a CSI generating section 1100, which generates CSI in PUCCH format 2, a CSI generating section 1110, which generates CSI in PUCCH format 3, an SRS signal generating section 1301, a DM-RS signal generating section 1302, a channel multiplexing section 1202, an IFFT section 1203, a CP attaching section 1204 and so on.

The OFDM signal demodulation section 1401 receives and demodulates a downlink OFDM signal. That is, the OFDM signal demodulation section 1401 removes the CPs from the downlink OFDM signal, performs a fast Fourier transform and takes out subcarriers to which the BCH signal or the downlink control signal is allocated, and demodulates the data. When the downlink OFDM signal is received from a plurality of cells (CCs), the data is demodulated on a per cell basis. The OFDM signal demodulation section 1401 outputs the downlink signal after the data demodulation to the CSI estimation section 1402.

The CSI estimation section 1402 estimates CSI using received reference signals (CSI-RSs) from each cell. For example, the CSI estimation section 1402 estimates CQIs on a per cell basis and generates CQI bit sequences. The CSI estimation section 1402 outputs each cell's CQI bit sequence to the transmission section (here, CSI selection section 1201).

The CSI selection section 1201 selects a physical uplink channel and a PUCCH format to apply to CSI feedback. To be more specific, depending on whether or not there is an uplink data signal to transmit, the CSI selection section 1201 determines whether to include and transmit the CSI feedback in the uplink shared channel (PUSCH) or transmit the CSI feedback in the uplink control channel (PUCCH). When the CSI feedback is transmitted in the uplink control channel, the CSI selection section 1201 selects the PUCCH format to apply to the CSI. When a plurality of cells are used in carrier aggregation, the CSI selection section 1201 selects a PUCCH format to adopt and so on per CSI of each cell.

For example, when uplink signals (user data) are transmitted via the PUSCH, the CSI selection section 1201 outputs the signals (a CQI bit sequence and so on) that is output from the CSI estimation section 1402 to the uplink shared channel processing section 1000. When uplink signals (user data) are not transmitted in subframes to feed back CSI, the CSI selection section outputs the signals to the CSI generating section 1100 for PUCCH format 2 and/or the CSI generating section 1110 for PUCCH format 3, and generates each cell's CSI in a predetermined PUCCH format.

When CSI is fed back using PUCCH resources, the CSI selection section 1201 selects the PUCCH format to apply to each cell's CSI, based on the number of cells to use in carrier aggregation and/or the priorities of the cells (the primary cell or the secondary cells). For example, when downlink transmission is performed using a single cell (primary cell) (see above FIG. 5A and FIG. 6A), the CSI selection section 1201 outputs a CQI bit sequence and so on to the CSI generating section 1100 that generates CSI in PUCCH format 2.

As shown in above FIG. 5C, when the CSI of the primary cell is generated in PUCCH format 2 and the CSIs of the secondary cells 1 and 2 are generated in PUCCH format 3, the CSI selection section 1201 outputs the primary cells' CQI bit sequence and so on to the CSI generating section 1100, and the secondary cells' CQI bit sequences and so on to the CSI the generating section 1110. As shown in above FIG. 6C, when the CSI of the primary cell and the CSIs of the secondary cells 1 and 2 are generated in PUCCH format 3, the CSI selection section 1201 outputs the CQI bit sequences and so on of each cell to the CSI generating section 1110 for PUCCH format 3. Note that, even in this case, the resources for PUCCH format 2 for the primary cell are not released and kept.

Information related to the PUCCH format to apply to each cell's CSI and PUCCH resources to allocate may be configured to be reported from the radio base station to the user terminal. In this case, the radio base station uses higher layer signaling (RRC and so on), broadcast signals, downlink control signals and so on and reports the information to the user terminal. Alternatively, this information may be defined in advance by specifications.

An uplink shared channel processing section 1000 has a control information bit determining section 1006, which determines CQI bits and so on, a channel coding section 1007, which performs error correction coding of CQI bit sequences and so on, a channel coding section 1001, which performs error correction coding of data sequences to be transmitted, data modulation sections 1002 and 1008, which perform data modulation of the data signal after the coding, a time multiplexing section 1003, which time-multiplexes the modulated data signal and the retransmission acknowledgement signal, a DFT section 1004, which performs a DFT (Discrete Fourier Transform) to the time-multiplexed signals, and a subcarrier mapping section 1005, which maps the signal after the DFT to subcarriers.

A CSI generating section 1100 for PUCCH format 2 has a channel coding section 1101, which performs error correction coding of CQI bit sequences and so on, a PSK data modulation section 1102, which performs PSK data modulation, a cyclic shift section 1103, which applies cyclic shifts to the data modulated in the PSK data modulation section 1102, and a subcarrier mapping section 1105, which maps the signal after the cyclic shifts to subcarriers.

The PSK data modulation section 1102 performs phase modulation (PSK data modulation) based on information that is reported from the channel coding section 1101. For example, the information is modulated to two-bit bit information by QPSK data modulation in the PSK data modulation section 1102.

The cyclic shift section 1103 performs orthogonal-multiplexing using cyclic shifts of a CAZAC (Constant Amplitude Zero Auto Correlation) code sequence. To be more specific, the cyclic shift section 1103 shifts the time domain signal in the predetermined amount of cyclic shifts. Note that the amount of cyclic shifts varies per user, and is associated with the cyclic shift number. The cyclic shift section 1103 outputs the signal after the cyclic shifts to the subcarrier mapping section 1104.

The subcarrier mapping section 1104 maps the signal after the cyclic shifts to subcarriers. The subcarrier mapping section 1104 outputs the mapped signal to the channel multiplexing section 1202.

A CSI generating section 1110 for PUCCH format 3 has a channel coding section 1111, which performs error correction coding of CQI bit sequences and so on, a PSK data modulation section 1112, which performs PSK data modulation, a DFT section 1113, which performs a DFT (Discrete Fourier Transform) of the data modulated in the PSK data modulation section 1112, and a block spreading section 1114, which performs block spreading of the signal after the DFT by block spreading codes, and a subcarrier mapping section 1115, which maps the signal after the block spreading to subcarriers.

The DFT section 1113 converts the signal after the data modulation to a frequency domain signal through a DFT, and outputs the signal after the DFT to the block spreading section 1114. The block spreading section 1114 multiplies the signal after the DFT by orthogonal code (OCC (block spreading code number)). Here, the OCC may be reported from a higher layer by RRC signaling and so on, or the OCC that is associated with the CS of the data symbols in advance may be used.

The subcarrier mapping section 1115 maps the signal after the block spreading to subcarriers. The subcarrier mapping section 1115 outputs the mapped signal to the channel multiplexing section 1202.

Note that, as shown in above FIG. 7, in a case where the user terminal uses a plurality of cells and adopts carrier aggregation, when a predetermined secondary cell is deactivated by MAC layer control, the CSI generating section 1110 tentatively sets a predetermined value as the CSI of the deactivated secondary cell, and applies PUCCH format 3.

The SRS signal generating section 1301 generates the SRS (Sounding RS) signal and outputs the signal to the channel multiplexing section 1202. The DM-RS signal generating section 1302 generates the DM-RS signal and outputs the signal to the channel multiplexing section 1202.

The channel multiplexing section 1202 time-multiplexes the signals from the uplink shared channel processing section 1000 and the CSI generating sections 1100 and 1110, and the reference signals from the SRS signal generating section 1301 and the DM-RS signal generating section 1302, and provides transmission signals including uplink control channel signals.

The IFFT section 1203 performs an IFFT of the channel-multiplexed signals and converts them into time domain signals. The IFFT section 1203 outputs the signals after the IFFT to the CP attaching section 1204. The CP attaching section 1204 adds CPs to the signals after the orthogonal code multiplication. Then, the uplink transmission signals are transmitted to the radio communication apparatus using a PCC uplink channel. Note that, the CSI generating section 1110 may be configured to multiply orthogonal code and multiplexes the signals in block spreading section 1114 following an IFFT process of the signals after the DFT.

Next, the functional configurations of a radio base station that performs radio communication with the user terminal shown in above FIG. 9 will be described with reference to FIG. 10.

Figure 10:
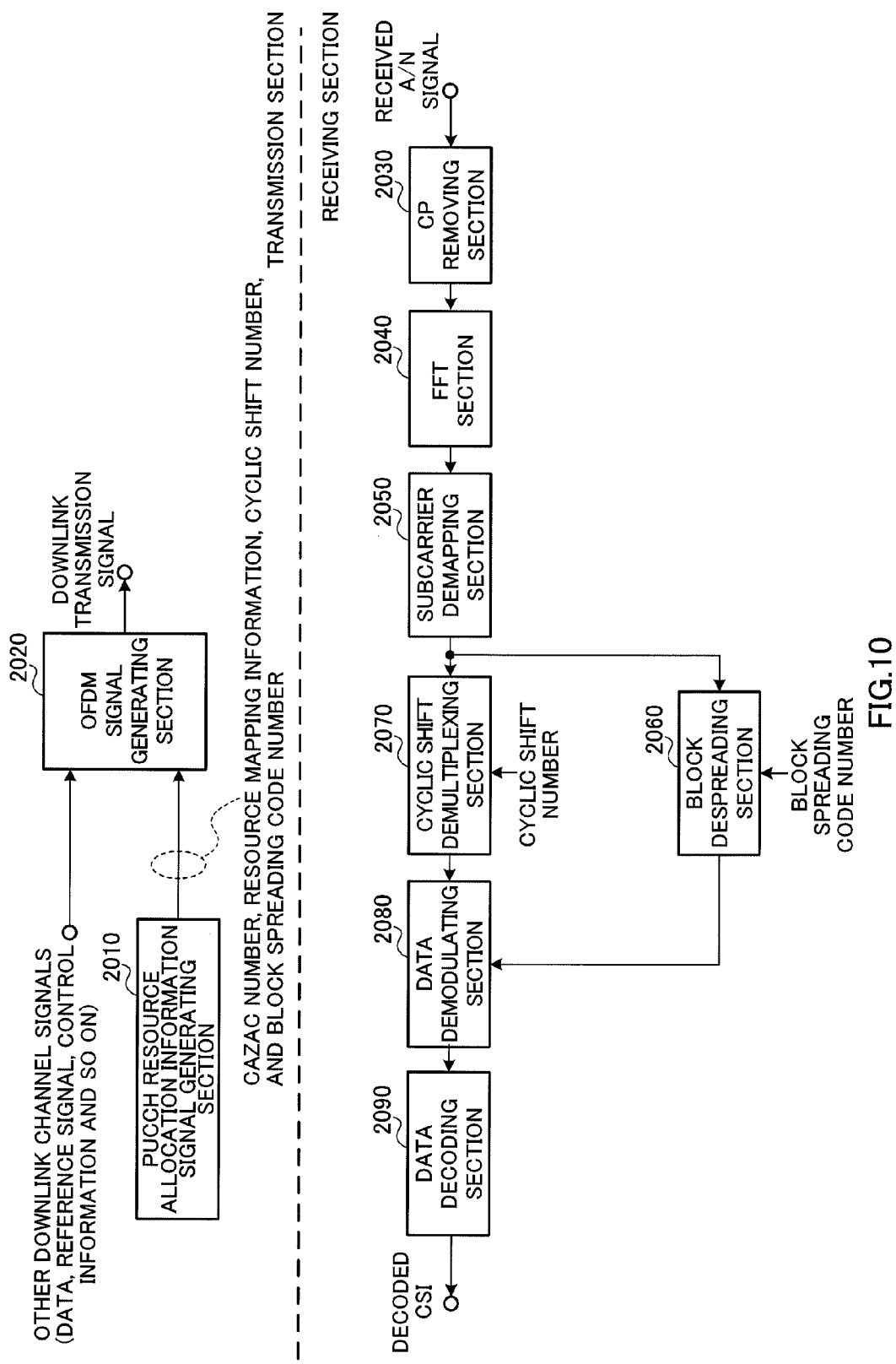
FIG. 10 is a diagram to explain a configuration of a radio base station.

The radio base station shown in FIG. 10 has a transmission section and a receiving section. The transmission section has an uplink resource (PUCCH resource) allocation information signal generating section 2010 and an OFDM signal generating section 2020, which multiplexes other downlink signals and uplink resource allocation information signals and generates OFDM signals. Here, the other downlink signals may be data, reference signals and control signals.

The uplink resource allocation information signal generating section 2010 generates the uplink resource allocation information signal that includes a CAZAC number, resource mapping information (an RB index), a cyclic shift number and a block spreading code number (OCC number). For example, the uplink resource allocation information signal generating section 2010 determines the PUCCH resources to set for periodic feedback of each CSI.

The uplink resource allocation information signal generating section 2010 can have a configuration including a function (setting section) for setting the PUCCH resources of the primary cell for the CSI to be fed back from the user terminal, at predetermined times in accordance with the PUCCH format that is applied to the CSI. In this case, the uplink resource allocation information signal generating section 2010 secures resources to set in the PUCCH when applying PUCCH format 2 to the CSI of the primary cell, regardless of the number of cells to use in carrier aggregation. Note that, the uplink resource allocation information signal generating section 2010 outputs the generated uplink resource allocation information signal to the OFDM signal generating section 2020.

The OFDM signal generating section 2020 generates the downlink transmission signal by mapping downlink signals including other downlink channel signals and the uplink resource allocation information signal to subcarriers, performing an inverse fast Fourier transform (IFFT), and attaching CPs. The downlink transmission signal generated in this way is transmitted to the user terminals 100 on the downlink.

The receiving section has a CP removing section 2030, which removes the CPs from received signals, an FFT section 2040, which performs a fast Fourier transform (FFT) of the received signals, a subcarrier demapping section 2050, which demaps the signals after the FFT, a cyclic shift separating section 2070, which removes the cyclic shifts from the signals after the subcarrier demapping and separates signals for target users, a block despreading section 2060, which despreads the signals after the subcarrier demapping by block spreading code (OCC), a data demodulating section 2080, which performs data modulation of the signals after the user separation and the signals after the despreading, and a data decoding section 2090, which decodes the signals after the data demodulation.

Note that, although processing blocks for receiving user data (PUSCH) are not shown in the functional blocks of the receiving section, the user data (PUSCH) is demodulated and decoded by a data demodulating section and a data decoding section, which are not shown.

The CP removing section 2030 removes parts that match the CPs and extracts effective signal parts. The CP removing section 2030 outputs the signals from which the CPs have been removed to the FFT section 2040. The FFT section 2040 performs an FFT of the received signals and transforms the signals to frequency domain signals. The FFT section 2040 outputs the signals after the FFT to the subcarrier demapping section 2050. The subcarrier demapping section 2050 extracts the CSI, which is the uplink control channel signal, from the frequency domain signals using resource mapping information. The subcarrier demapping section 2050 outputs the extracted CSI to the cyclic shift separating section 2070 and/or the block despreading section 2060.

The cyclic shift separating section 2070 separates control signals that have been orthogonal-multiplexed using cyclic shifts, by using cyclic shift numbers. Uplink control signals from the user terminals 100 are subjected to cyclic shifting, in varying cyclic shift amounts, on a per user basis. Consequently, by applying cyclic shifts in the opposite direction in the same amount of cyclic shift as the amount of cyclic shifts applied in the user terminals 100, it is possible to separate the control signals for the user targeted for the receiving process. Note that the cyclic shift separating section 2070 processes the feedback CSI generated in PUCCH format 2.

The block despreading section 2060 despreads the received signals that have been block despread, that is, orthogonal-multiplexed by using orthogonal code (OCC), using the orthogonal code used in the user terminal. Note that the block despreading section 2060 performs processes for the feedback CSI generated in PUCCH format 3.

The data demodulating section 2080 performs data demodulation of the signals from which the cyclic shifts have been separated or the signals that have been subjected to the block despreading, and then outputs the results to the data decoding section 2090. The data decoding section 2090 decodes the signals output from the data demodulating section 2080 and acquires the CSI per cell. The radio base station performs scheduling and adaptive radio link control using the acquired CSI.

Without departing from the scope of the present invention, it is possible to adequately change the number of processing sections and the steps of processing in the above description, and implement the present invention. Elements illustrated in the drawings each have functions, and each functional block may be implemented by hardware or may be implemented by software. In addition, it is possible to combine each configuration described in the embodiment as appropriate, and implement the embodiment.

The disclosure of Japanese Patent Application No. 2012-172276, filed on Aug. 2, 2012, including the specification, drawings, and abstract, is incorporated herein by reference in its entirety.

The invention claimed is:

1. A radio communication method of a user terminal and a radio base station adopting carrier aggregation, the radio communication method comprising the steps in which:
    the user terminal:
        selects one of uplink control channel format 2 and uplink control channel format 3 for each cell based on the number of cells to use in carrier aggregation and generates channel state information of the each cell in the selected one of uplink control channel format 2 and uplink control channel format 3; and
        feeds back the generated channel state information via resources that the radio base station sets in an uplink control channel of a primary cell at a predetermined time in accordance with an uplink control channel format; and
    wherein the radio base station secures the resources to set in the uplink control channel the channel state information of the primary cell generated in uplink control channel format 2, regardless of the number of cells to use in carrier aggregation.

2. The radio communication method according to claim 1, wherein the user terminal generates the channel state information of the primary cell and a secondary cell in uplink control channel format 2 when the number of primary cells and secondary cells to use in carrier aggregation is smaller than a predetermined number, generates the channel state information of the primary cell in uplink control channel format 2 when the number of primary cells and secondary cells is equal to or larger than the predetermined number, and generates the channel state information of a plurality of secondary cells in uplink control channel format 3.

3. The radio communication method according to claim 2, wherein the user terminal sets the channel state information of different cells generated in uplink control channel format 2, in uplink control channel resources of varying subframes, and sets the channel state information of different cells generated in uplink control channel format 3, in uplink control channel resources of a same subframe.

4. The radio communication method according to claim 1, wherein, the user terminal generates the channel state information of the primary cell and the secondary cell in uplink control channel format 2 when the number of primary cells and secondary cells to use in carrier aggregation is smaller than a predetermined number, and generates the channel state information of the primary cell and the secondary cell in uplink control channel format 3 when the number of primary cells and secondary cells is equal to or larger than the predetermined number.

5. The radio communication method according to claim 4, wherein the user terminal sets the channel state information of different cells generated in uplink control channel format 2, in uplink control channel resources of varying subframes, and sets the channel state information of different cells generated in uplink control channel format 3, in uplink control channel resources of a same subframe.

6. The radio communication method according to claim 1, wherein the user terminal generates the channel state information of a secondary cell in uplink control channel format 3, regardless of the number of primary cells and secondary cells to use in carrier aggregation.

7. The radio communication method according to claim 6, wherein the user terminal sets the channel state information of different cells generated in uplink control channel format 2, in uplink control channel resources of varying subframes, and sets the channel state information of different cells generated in uplink control channel format 3, in uplink control channel resources of a same subframe.

8. The radio communication method according to claim 1, wherein the user terminal sets the channel state information of different cells generated in uplink control channel format 2, in uplink control channel resources of varying subframes, and sets the channel state information of different cells generated in uplink control channel format 3, in uplink control channel resources of a same subframe.

9. The radio communication method according to claim 1, wherein, when the user terminal generates and feeds back the channel state information of a plurality of secondary cells in uplink control channel format 3 in a same subframe, and then detects that one of the plurality of secondary cells is deactivated by MAC control, the user terminal makes the channel state information of the deactivated secondary cell a fixed value, generates the channel state information of the plurality of secondary cells in uplink control channel format 3, and feeds back in the same subframe.

10. The radio communication method according to claim 1, wherein, when the user terminal generates and feeds back the channel state information of a plurality of secondary cells in uplink control channel format 3 in a same subframe, and then detects that one of the plurality of secondary cells is deactivated by MAC control, the user terminal makes the channel state information of the deactivated secondary cell out-of-range, generates the channel state information of the plurality of secondary cells in uplink control channel format 3, and feeds back in the same subframe.

11. The radio communication method according to claim 1, wherein, when the user terminal generates and feeds back the channel state information of a plurality of secondary cells in uplink control channel format 3 in a same subframe, and then detects that all of the plurality of secondary cells are deactivated by MAC control, the user terminal makes the channel state information of all the secondary cells out-of-range, generates the channel state information of the plurality of secondary cells in uplink control channel format 3, and feeds back in the same subframe.

12. The radio communication method according to claim 1, wherein, when the user terminal generates and feeds back the channel state information of a plurality of secondary cells in uplink control channel format 3 in a same subframe, and then detects that all of the plurality of secondary cells are deactivated by MAC control, the user terminal stops the feedback of the channel state information of all the secondary cells.

13. A radio communication system having a user terminal and a radio base station adopting carrier aggregation,
the user terminal comprising:
a first processor that selects one of uplink control channel format 2 and uplink control channel format 3 for each cell based on the number of cells to use in carrier aggregation and generates channel state information of the each cell in the selected one of uplink control channel format 2 and uplink control channel format 3; and
a transmitter that feeds back the generated channel state information via resources that the radio base station sets in an uplink control channel of a primary cell at a predetermined time in accordance with an uplink control channel format; and
the radio base station comprising:
a second processor that, in response to channel state information that is fed back from the user terminal, secures the resources to set in the uplink control channel the channel state information of the primary cell generated in uplink control channel format 2, regardless of the number of cells to use in carrier aggregation.

14. A user terminal that adopts carrier aggregation and communicates with a radio base station, the user terminal comprising:
a processor that selects one of uplink control channel format 2 and uplink control channel format 3 for each cell based on the number of cells to use in carrier aggregation and generates channel state information of the each cell in the selected one of uplink control channel format 2 and uplink control channel format 3; and
a transmitter that feeds back the generated channel state information via resources that the radio base station sets in an uplink control channel of a primary cell at a predetermined time in accordance with an uplink control channel format,
wherein the resources set in the uplink control channel are secured for the channel state information of the primary cell generated in uplink control channel format 2, regardless of the number of cells to use in carrier aggregation.

* * * * *